(12) United States Patent
Moriyama et al.

(10) Patent No.: US 8,859,648 B2
(45) Date of Patent: Oct. 14, 2014

(54) RETARDATION FILM AND POLYESTER RESIN FOR OPTICAL USE

(75) Inventors: Hideki Moriyama, Shiga (JP); Shigetoshi Maekawa, Shiga (JP); Jun Sakamoto, Shizuoka (JP); Akimitsu Tsukuda, Shiga (JP); Masahiro Kimura, Kyoto (JP); Risa Taniguchi, Kyoto (JP)

(73) Assignee: Toray Industries, Inc., Tokyo (JP)

( * ) Notice: Subject to any disclaimer, the term of this patent is extended or adjusted under 35 U.S.C. 154(b) by 1664 days.

(21) Appl. No.: 11/920,777

(22) PCT Filed: May 23, 2006

(86) PCT No.: PCT/JP2006/310188
§ 371 (c)(1),
(2), (4) Date: Nov. 20, 2007

(87) PCT Pub. No.: WO2006/126506
PCT Pub. Date: Nov. 30, 2006

(65) Prior Publication Data
US 2009/0207490 A1    Aug. 20, 2009

(30) Foreign Application Priority Data

May 25, 2005 (JP) ................................. 2005-151953
Jun. 28, 2005 (JP) ................................. 2005-187876

(51) Int. Cl.
| | | |
|---|---|---|
| C08L 67/02 | (2006.01) | |
| C08G 63/133 | (2006.01) | |
| C08G 63/18 | (2006.01) | |
| C08J 5/18 | (2006.01) | |
| G02B 5/30 | (2006.01) | |
| C08G 63/199 | (2006.01) | |
| C08G 63/553 | (2006.01) | |

(52) U.S. Cl.
CPC ............... *C08J 5/18* (2013.01); *G02B 5/3025* (2013.01); *C08J 2367/00* (2013.01); *C08G 63/199* (2013.01); *C08G 63/553* (2013.01); *G08G 63/672* (2013.01)
USPC ........... 523/500; 525/437; 528/176; 528/190; 528/193; 528/194

(58) Field of Classification Search
CPC ..... C08G 63/19; C08G 63/193; C08G 63/197
USPC ........... 523/500; 525/437; 528/176, 190, 193, 528/194
See application file for complete search history.

(56) References Cited

U.S. PATENT DOCUMENTS

| | | | |
|---|---|---|---|
| 6,066,711 A * | 5/2000 | Hanazawa et al. ............. | 528/176 |
| 2007/0106053 A1 * | 5/2007 | Fuji et al. ...................... | 528/272 |
| 2007/0293606 A1 * | 12/2007 | Yamada et al. ................. | 524/88 |
| 2008/0085955 A1 * | 4/2008 | Yanagida et al. ............... | 524/90 |

FOREIGN PATENT DOCUMENTS

| | | | | | |
|---|---|---|---|---|---|
| JP | 02170824 A | * | 7/1990 | ........... | C08G 63/199 |
| JP | 10-36494 A | | 2/1998 | | |
| JP | 11-60706 A | | 3/1999 | | |
| JP | 2004-175912 A | | 6/2004 | | |
| JP | 2004-182975 A | | 7/2004 | | |
| JP | 2004-210873 A | | 7/2004 | | |
| JP | 2004315676 A | * | 11/2004 | ........... | C08G 63/199 |
| JP | 2006-215064 A | | 8/2006 | | |
| WO | WO 2004078824 A1 * | | 9/2004 | ........... | C08G 63/199 |
| WO | WO 2006006731 A1 * | | 1/2006 | ............. | C08L 67/02 |

OTHER PUBLICATIONS

English machine translation JP 11-060706; May 18, 2011.*

* cited by examiner

*Primary Examiner* — Michael Pepitone
(74) *Attorney, Agent, or Firm* — Birch, Stewart, Kolasch & Birch, LLP

(57) ABSTRACT

The present invention relates to a retardation film using polyester having a photoelastic coefficient of $-40 \times 10^{-12}$ $Pa^{-1}$ to $40 \times 10^{-12}$ $Pa^{-1}$. The present invention also relates to a polyester resin for optical use which contains a phosphorus compound, and an alicyclic component and a fluorene derivative component as constituents, and satisfies the following equations (6) and (7):

$$100°\text{C.} \leq \text{glass transition temperature} \leq 150°\text{C.} \quad (6)$$

and $$1.0 \leq (Ma/2 + Mb + Mc)/P \leq 5.0 \quad (7),$$

wherein Ma is the number of moles of an alkali metal element contained in 1 ton of the polyester resin, Mb is the number of moles of an alkaline earth metal element contained in 1 ton of the polyester resin, Mc is the sum of the number of moles of a zinc element (Zn), a cobalt element (Co) and a manganese element (Mn) contained in 1 ton of the polyester resin, and P is the number of moles of a phosphorus element contained in 1 ton of the polyester resin.

9 Claims, No Drawings

RETARDATION FILM AND POLYESTER RESIN FOR OPTICAL USE

TECHNICAL FIELD

The present invention relates to a retardation film.

BACKGROUND ART

Retardation films are mainly used as a member to expand a viewing angle of a liquid crystal display or a constituent member of a circular polarizer.

As the retardation film, polycarbonate is disclosed in Patent Document 1. However, polycarbonate has a problem of retardation irregularity in a peripheral portion of a screen, which is called "frame defect", since it has large photoelastic coefficient. This problem becomes obvious as a screen of the liquid crystal display becomes large, and the retardation film having a small photoelastic coefficient is required.

A cyclic polyolefin resin is disclosed in Patent Document 2. Since the cyclic polyolefin resin has excellent properties such as a small photoelastic coefficient and low water absorption, it is widely used as a retardation film, but it is expensive and there is a need for a low cost retardation film.

On the other hand, since a polyester film is highly transparent and low cost, it is widely used. Application of this film to the retardation film is investigated as disclosed in Patent Document 3, but since it has a large photoelastic coefficient and retardation characteristics are highly sensitive to stretching conditions, it was difficult to control the retardation properly. Polyester having small birefringence is disclosed in Patent Document 4, but it has a problem that the photoelastic coefficient is large. Further, polyester having small birefringence is disclosed in Patent Document 5, but since a glass transition temperature is low, there is a problem that the retardation changes in the production process and the use environment of the liquid crystal display. In addition, polyester having small birefringence is disclosed in Patent Document 6, but the photoelastic coefficient and the wavelength dispersion, which are necessary for the retardation film, have not been investigated, and it has a problem that a film forming property is defective and a uniform film cannot be obtained.

[Patent Document 1] Japanese Unexamined Patent Publication No. 2001-318233
[Patent Document 2] Japanese Unexamined Patent Publication No. 2004-151573
[Patent Document 3] Japanese Unexamined Patent Publication No. 2000-162419
[Patent Document 4] Japanese Patent Publication No. 2843215
[Patent Document 5] Japanese Patent Publication No. 2854796
[Patent Document 6] Japanese Patent Publication No. 3331121

DISCLOSURE OF THE INVENTION

Problems to be Solved by the Invention

The present invention has been investigated and made to solve the problems in the prior art. That is, it is an object of the present invention to provide a retardation film using polyester having a small photoelastic coefficient. In addition, it is a second object of the present invention to provide a polyester resin for optical use having suitable heat resistance and good optical properties as a raw material for the above retardation film.

Means for Solving the Problems

The present invention for achieving the problems described above is characterized by a retardation film using polyester having a photoelastic coefficient of $-40 \times 10^{-12}$ $Pa^{-1}$ to $40 \times 10^{-12}$ $Pa^{-1}$.

Herein, when a slow axis direction of the retardation film is denoted by x, a direction orthogonal to this x in the film plane is denoted by y, a direction orthogonal to these x and y is denoted by z, and refractive indexes in the directions x, y and z are denoted by nx, ny and nz, respectively, preferably, the above-mentioned retardation film satisfies the following equations (1) and (2):

$$nx \geq ny \qquad (1),$$

and $$-0.001 < ny - nz < 0.001 \qquad (2).$$

A glass transition temperature of the above polyester is also preferably 100° C. or higher.

Furthermore, the second object of the present invention described above can be achieved by a polyester resin for optical use, containing a phosphorus compound, and an alicyclic component and a fluorene derivative component as constituents, and satisfying the following equations (6) and (7):

$$100°\ C. \leq \text{glass transition temperature} \leq 150°\ C. \qquad (6)$$

$$1.0 \leq (Ma/2 + Mb + Mc)/P \leq 5.0 \qquad (7),$$

wherein Ma is the number of moles of an alkali metal element contained in 1 ton of the polyester resin, Mb is the number of moles of an alkaline earth metal element contained in 1 ton of the polyester resin, Mc is the sum of the number of moles of a zinc element (Zn), a cobalt element (Co) and a manganese element (Mn) contained in 1 ton of the polyester resin, and P is the number of moles of a phosphorus element contained in 1 ton of the polyester resin.

Effect of the Invention

In accordance with the present invention, it is possible to form a retardation film having a good casting property and less extraneous substances such as a fish eye through melt film fabrication for a variety of optical members using a retardation film such as a flat panel display, and to reduce a production cost.

BEST MODE FOR CARRYING OUT THE INVENTION

A retardation film of the present invention has a photoelastic coefficient of $-40 \times 10^{-12}$ $Pa^{-1}$ to $40 \times 10^{-12}$ $Pa^{-1}$. The retardation film of the present invention is preferable since, by having a photoelastic coefficient of $-4 \times 10^{-12}$ $Pa^{-1}$ to $40 \times 10^{-12}$ $Pa^{-1}$, a change in retardation of the retardation film is small even when it is subjected to a stress due to thermal expansion of another member bonded to the retardation film or a residual stress in using the retardation film for liquid crystal televisions with large screens. Preferably, the absolute value of the photoelastic coefficient is small because the change in retardation corresponding to a stress is small, and the absolute value of the photoelastic coefficient is preferably $1 \times 10^{-12}$ $Pa^{-1}$ to $40 \times 10^{-12}$ $Pa^{-1}$, and more preferably $1 \times 10^{-12}$ $Pa^{-1}$ to $30 \times 10^{-12}$ $Pa^{-1}$. A smaller absolute value of the photoelastic coefficient is more preferable and it is ideally zero, but a lower limit of the absolute value of the photoelastic coefficient of the polyester of the present invention becomes about $1\times10^{-12}$ $Pa^{-1}$ because of the polarity due to an ester group. Furthermore, the photoelastic coefficient is preferably in a range of $-30\times10^{-12}$ $Pa^{-1}$ to $30\times10^{-12}$ $Pa^{-1}$, preferably in a range of $-20\times10^{-12}$ $Pa^{-1}$ to $20\times10^{-12}$ $Pa^{-1}$, more preferably in a range of $-5\times10^{-12}$ $Pa^{-1}$ to $5\times10^{-12}$ $Pa^{-1}$, and most preferably in a range of $-3\times10^{-12}$ $Pa^{-1}$ to $3\times10^{-2}$ $Pa^{-1}$. Usually, the retardation is provided by anisotropic stretching. When a film antecedent to providing of the retardation, for example, a non-stretched film has the photoelastic coefficient of $-3\times10^{-12}$ $Pa^{-1}$ to $3\times10^{-12}$ $Pa^{-1}$, there may be cases where the aimed retardation cannot be imparted. But, desirably, the photoelastic coefficient after imparting the aimed retardation is ideally zero.

In the present invention, it is important that polyester is used in the retardation film. By using the polyester which is a general-purpose resin which is capable of melt film fabrication, a low-cost retardation film can be provided. Herein, polyester refers to a polymer having an ester bond on the main chain, and examples of the polymers include polyethylene terephthalate, polyethylene-2,6-naphthalate, polybutylene terephthalate, and the like.

In the present invention, when the slow axis direction of the retardation film is denoted by x, the direction orthogonal to this x in the film plane is denoted by y, the direction orthogonal to these x and y is denoted by z, and refractive indexes in the directions x, y and z are denoted by nx, ny and nz, respectively, it is preferable to satisfy the following equations (1) and (2):

$$nx \geq ny \quad (1),$$

and $$-0.001 < ny - nz < 0.001 \quad (2).$$

In the equation (2), ny represents a refractive index in a fast axis direction and nz represents a refractive index in a thickness direction. If there is a large difference between ny and nz, a viewing angle characteristic may be deteriorated.

In the present invention, it is a preferable aspect that a glass transition temperature (Tg) of the polyester used in the retardation film is 100° C. or higher. A liquid crystal display is heated by internal heat such as a backlight or external heat resulting from an external environment, and the liquid crystal display needs such heat resistance that the retardation is not changed by these heating. If an ambient temperature is higher than Tg, the retardation may vary since molecules becomes easy-to-move. As retardation films to be used for common liquid crystal televisions used indoors, it is important to employ the polyester having Tg of 100° C. or higher. More preferably, the polyester having Tg of 120° C. or higher is used in order to withstand outdoor use or in-car use. There is not an upper limit for Tg of the retardation film, but in the case of forming the retardation film through melt film fabrication, preferably, Tg of the polyester to become a raw material is in a range of 100 to 150° C. from the viewpoint of processability. When Tg is less than 100° C., heat resistance of the retardation film is insufficient and the retardation film cannot be applied to a display and the like, and when it is more than 150° C., optical anisotropy and a photoelastic coefficient tends to become large and therefore film fabrication or stretching may become difficult. A Tg of the polyester to become a raw material is preferably 100 to 145° C., and particularly preferably is 120 to 140° C.

Preferably, the polyester used in the present invention has an alicyclic structure. When many aromatic structures are introduced for the purpose of improving the Tg of polyester, the photoelastic coefficient tends to increase (herein after, may be referred to as "be deteriorated") with the Tg. On the other hand, when many linear aliphatic structures are introduced for the purpose of reducing the photoelastic coefficient, the Tg is lowered. The alicyclic structure is preferable because it can achieve a low photoelastic coefficient and a high Tg simultaneously.

In addition, preferably, the polyester used in the present invention has a cardo structure. With respect to the cardo structure, a structure, in which two benzene rings in a main chain portion are joined to a fluorene ring in the form of hinge as illustrated in, for example, a structure shown in the chemical formula (I) described later, is generally called a cardo structure.

It has been described that when many aromatic structures are introduced for the purpose of improving the Tg of polyester, the photoelastic coefficient is deteriorated. However, in an aromatic compound having a cardo structure, since the photoelasticity of the aromatic compound in a direction of straight chain is specifically canceled by that of an aromatic compound in a direction orthogonal to the straight chain direction, it becomes possible to attain a small photoelastic coefficient even though having high Tg. Here, when number of aromatic rings in a main chain portion of the cardo structure is denoted by Ar(x) and number of aromatic rings in an intersection of the main chain and the cardo structure is denoted by Ar(y), it is more preferable that Ar(x) and Ar(y) satisfy the following equation (3):

$$0.9 < Ar(y)/Ar(x) < 1.1 \quad (3).$$

And, by satisfying the equation (3), reverse dispersion property can be attained.

Here, the number of aromatic rings is counted as follows (the number of aromatic rings is shown in a parenthesis). That is, Benzene (1), naphthalene (2), biphenyl (2), and fluorene (2). Fluorene has a tricyclic structure, but a five-membered ring site is an alicyclic structure which cannot assume a resonance structure. Therefore, the number of aromatic rings is counted as two.

Furthermore, the alicyclic structure and the cardo structure of polyester used in the present invention will be described in detail.

Alicyclic structure: By using, for example, diol or carboxylic acid having an alicyclic structure shown in the chemical formula (VII), or ester-forming derivatives thereof as a raw material of polyester, an alicyclic structure can be introduced into polyester. More preferably from the viewpoint of ease of raw material availability and low cost, as the diols among them, 3,9-bis(1,1-dimethyl-2-hydroxyethyl)-2,4,8,10-tetraoxaspiro [5,5]undecane (herein after, referred to as "Spiro glycol") is preferable, and dicarboxylic acids or ester-forming derivatives thereof, cyclohexanedicarboxylic acid or ester-forming derivatives thereof are preferable. Cyclohexanedicarboxylic acid or ester-forming derivatives thereof have two isomers of a cis form (chair) and a trans form (boat), but cyclohexanedicarboxylic acid having many trans forms is preferable for the purpose of improving the Tg. On the other hand, cyclohexanedicarboxylic acid having many cis forms is preferable for the purpose of improving the Tg without deteriorating the photoelastic coefficient, although an effect of improving the Tg is smaller than that of cyclohexanedicarboxylic acid having many trans forms.

[Formula 1]
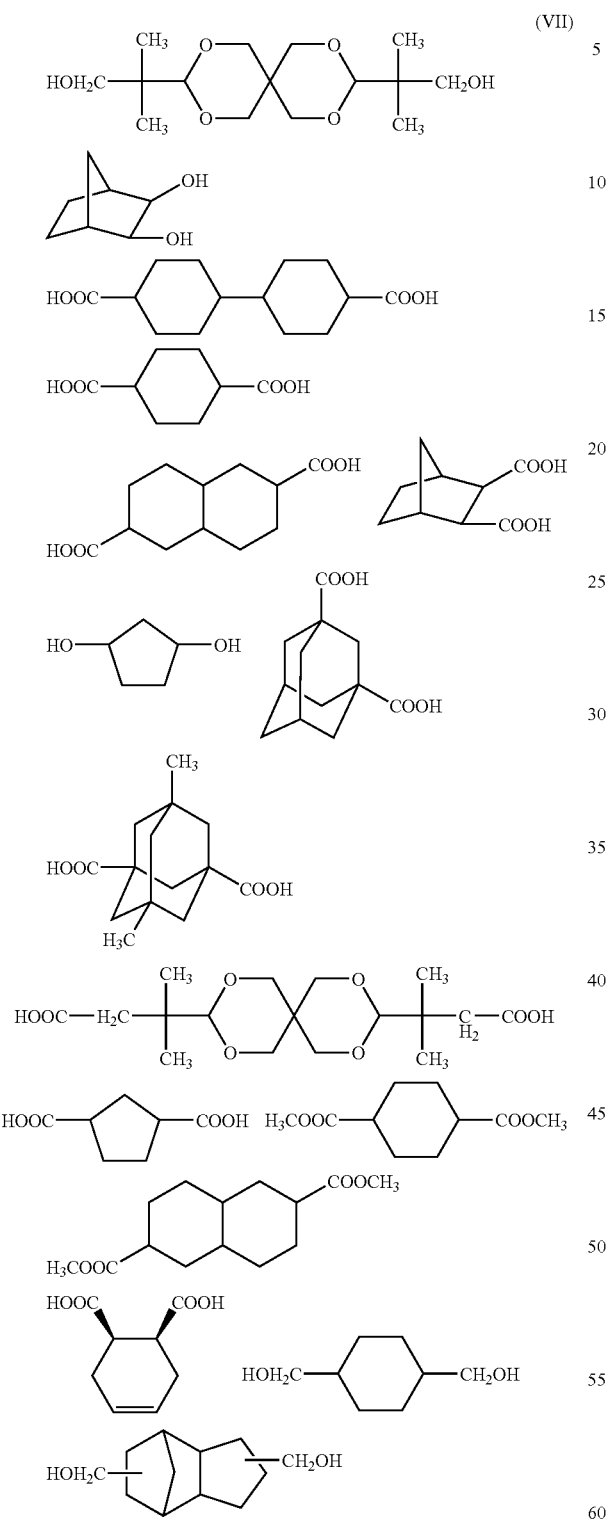
(VII)
[Formula 2]
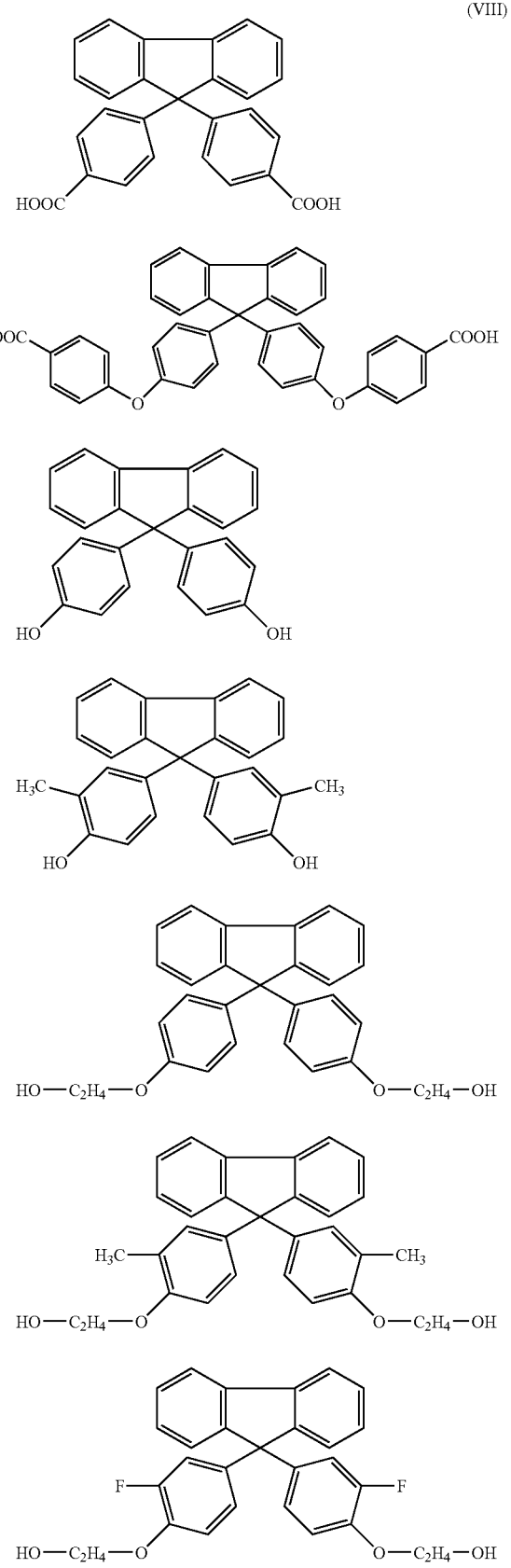
(VIII)
Cardo structure: By using, for example, diol or carboxylic acid having a cardo structure shown in the chemical formula (VIII), or ester-forming derivatives thereof as a raw material of polyester, a cardo structure can be introduced into polyester.

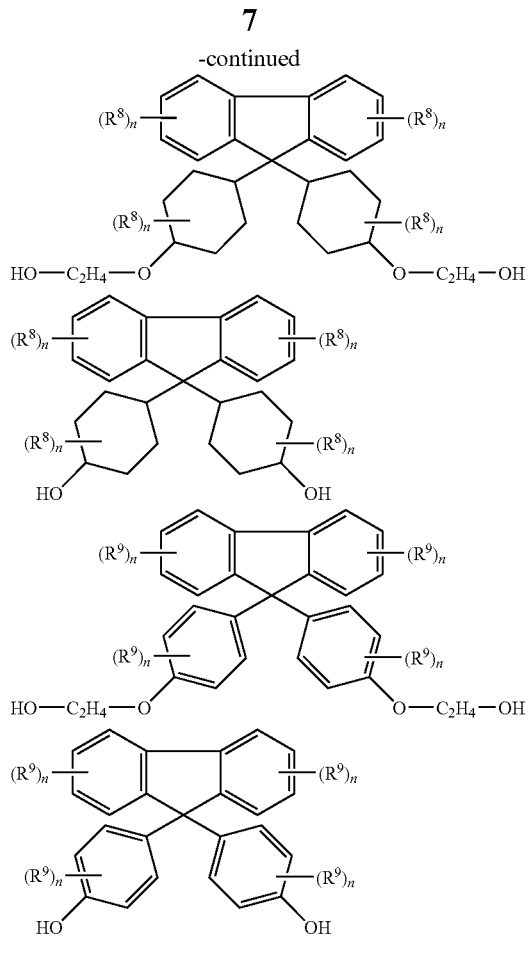

R⁹: independently representing an arbitrary substituent n: independently representing an integer of 0 to 4

Among these, diol in which a hydroxyl group is combined directly with an aromatic ring may become low in reactivity. Preferably, diol has a structure in which the hydroxyl group is combined with an aromatic ring through an ether bond and ethylene, and more preferably diol is a compound (hereinafter, referred to as "BPEF") shown in the chemical formula (IX) from the viewpoint of ease of availability.

[Formula 3]

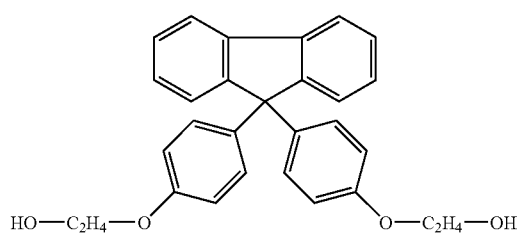

(IX)

Preferable mole fractions (%) of the alicyclic structure and the cardo structure will be described. Preferably, the polyester of the present invention includes a structural unit expressed by the chemical formulas (I), (II), (III), or (IV) and, preferably, when the mole fractions (%) of structural units expressed by the chemical formulas (I), (II), (III) and (IV) are denoted by l, m, n, and o, respectively, l, m, n, and o satisfy the following equations (4) and (5):

$$80 < l+m+n+o \leq 100 \quad (4)$$

$$10 \leq l+m \leq 100 \quad (5)$$

[Formula 4]

$R^1$: A group having an alicyclic structure
$R^2$: Hydrogen, halogen or a hydrocarbon group having 1 to 3 carbon atom(s)

[Formula 5]

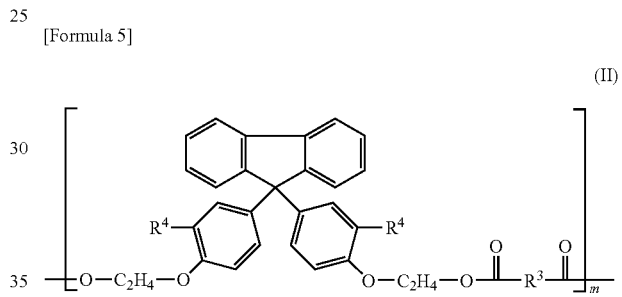

$R^3$: An aromatic group
$R^4$: Hydrogen, halogen or a hydrocarbon group having 1 to 3 carbon atom(s)

[Formula 6]

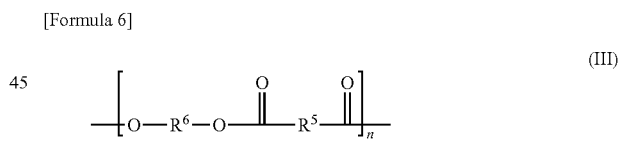

$R^5$: A group having an alicyclic structure
$R^6$: An aliphatic hydrocarbon having 2 to 4 carbon atoms, or a group having an alicyclic structure

[Formula 7]

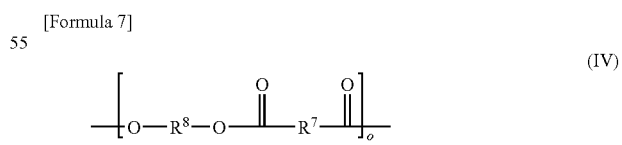

$R^7$: An aromatic group
$R^8$: An aliphatic hydrocarbon having 2 to 4 carbon atoms, or a group having an alicyclic structure In the chemical formulas (I), (II), (III) and (IV), l+m represents a mole fraction (%) of a structure having the cardo structure derived from diols. The cardo structure is preferable because it has small deterioration of the photoelastic coefficient and has an effect of improving the Tg. Preferably, l+m is at least 10 and at most 100, more preferably at least 50 and at most 100, and further preferably at least 70 and at most 100.

In the above description, preferably, $R^1$ and $R^5$ are groups having an alicyclic structure. It is required for the retardation film that changes in dimension or changes in retardation are small in the production process and the use environment of the retardation film. In order to achieve this, it is necessary that the photoelastic coefficient is in a range of $-40\times10^{-12}$ $Pa^{-1}$ to $40\times10^{-12}$ $Pa^{-1}$ and, preferably, the glass transition temperature is 100° C. or higher. It is useful to reduce an amount of aromatic components and increase an amount of aliphatic components for decreasing the photoelastic coefficient. However, if a linear aliphatic is introduced, the glass transition temperature may become, for example, less than 100° C. and this may cause changes in dimension or changes in retardation in the production process and the use environment of the retardation film. The alicyclic structure is known to have higher glass transition temperature compared with a linear aliphatic even though it has an aliphatic structure with a small photoelastic coefficient. That is, the alicyclic structure can reduce the photoelastic coefficient without lowering the glass transition temperature by a large amount compared with the aromatic, and can improve the glass transition temperature without deteriorating the photoelastic coefficient by a large amount compared with the linear aliphatic. Here, the alicyclic structure is not particularly limited, and any alicyclic structure is used, but $R^1$ and $R^5$ are carboxylic acids or ester-forming derivative residues thereof, and it is preferable that carboxylic acids or ester-forming derivative residues thereof, being raw materials, are preferably readily available. Examples of readily available carboxylic acids include cyclopentanedicarboxylic acid, cyclohexanedicarboxylic acid, decalindicarboxylic acid, bicyclohexanedicarboxylic acid, norbornenedicarboxylic acid, adamantanedicarboxylic acid, and 3,9-bis(1,1-dimethyl-2-ethylcarboxylate)-2,4,8,10-tetraoxaspiro[5.5]undecane. Preferably, $R^1$ and $R^5$ are any of structures, which are residues of these carboxylic acids, shown in the chemical formulas (V):

[Formula 8]

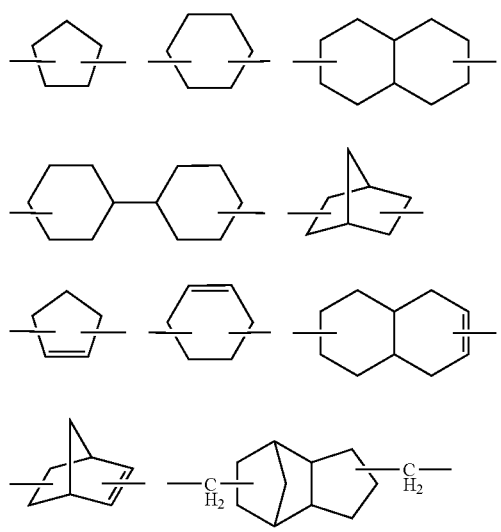

(V)

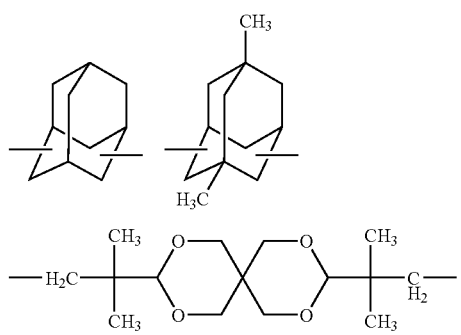

In addition, in the above description, also preferably, $R^1$ and $R^5$ are a cyclohexane structure, a cyclohexene structure and/or a decalin structure because of ease of availability and excellent properties of the polyester to be obtained. More preferably, $R^1$ and $R^5$ are cyclohexane structures.

Furthermore, preferably, the retardation film has a controlled photoelastic coefficient in its applications. It is possible to control the photoelastic coefficient by the addition of an anisotropic crystal or the change in a molecular structure, and a method of incorporating a polar group or an aromatic into a molecular chain is preferable because of the stability of the photoelastic coefficient to be obtained and less deleterious effect on other properties. The method of incorporating an aromatic into a molecular chain is particularly preferable since the glass transition temperature can be improved simultaneously by this method. Here, it is useful to incorporate an aromatic into a direction of the main chain for the purpose of increasing the photoelastic coefficient in a positive direction. In addition, it is useful to incorporate an aromatic into a direction orthogonal to the main chain for the purpose of increasing the photoelastic coefficient in a negative direction. Furthermore, this is preferable since the refractive index in a thickness direction and the wavelength dispersion property of the retardation can be controlled by introducing an aromatic into a direction of main chain and a direction orthogonal to the main chain. The aromatic compound is not particularly limited, but, preferably, $R^3$ and $R^7$ are any of structures shown in the chemical formulas (VI):

[Formula 9]

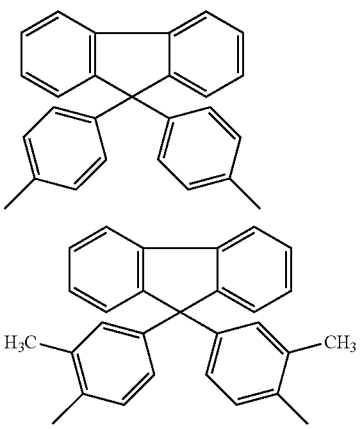

(VI)

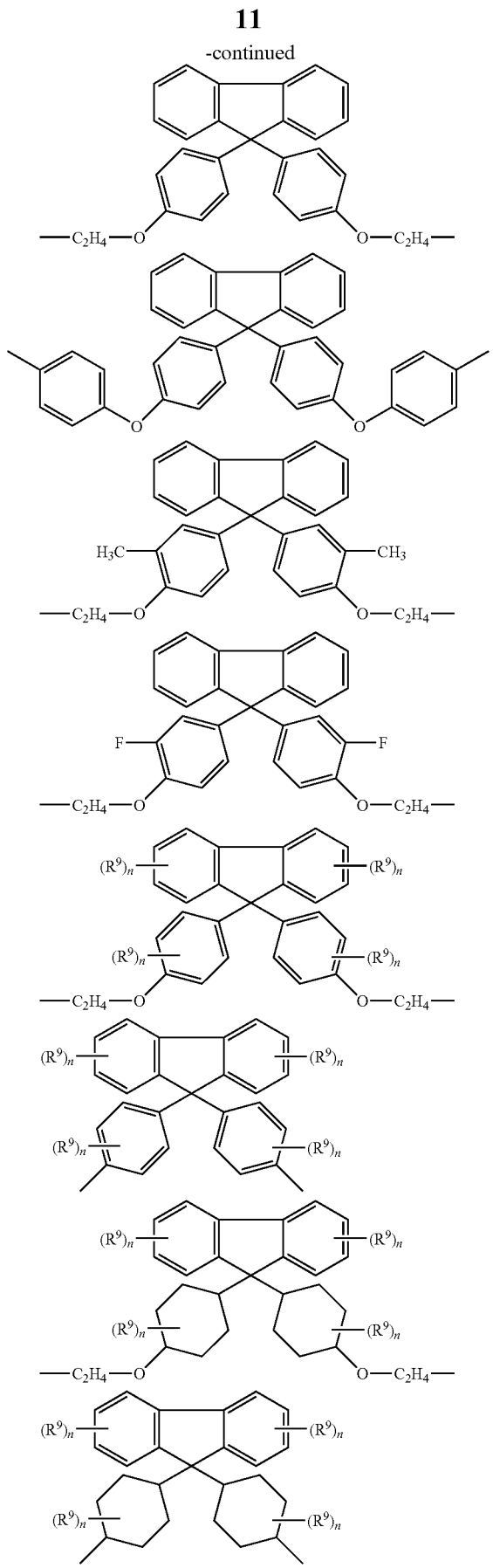

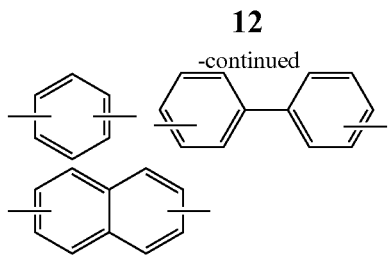

In addition, preferably, $R^6$ and $R^8$ are alicyclic structures such as a spiro glycol residue for the purpose of improving the Tg in the above description. On the other hand, when the Tg is adjusted for the purpose of enabling melt film fabrication, preferably, they are aliphatic hydrocarbon structure, such as ethylene, having 2 to 4 carbon atoms from the viewpoint of reactivity, ease of availability and preventing of the deterioration of the photoelastic coefficient. Among others, preferably, $R^6$ and $R^8$ are spiro glycol residues or ethylene structures from the viewpoint of ease of availability.

Next, "wavelength dispersion property" and "reverse dispersion" of the retardation film associated with the cardo structure will be described.

"The retardation film" refers to a film which produces a difference between a phase of the fast axis and a phase of the slow axis when light having a certain wavelength passes through, and in the present invention, the retardation film refers to all films which give retardation such as a λ/4 retardation film to give the retardation of ¼ wavelength, a λ/2 retardation film to give the retardation of ½ wavelength, a viewing angle expanding film, and an optical compensation film.

Here, the fast axis refers to a direction in a plane in which light passes through most fast, and the slow axis refers to a direction in a plane orthogonal to the fast axis.

The retardation film includes the ¼ retardation film and the ½ retardation film, and in the ¼ retardation film, preferably, the retardation is a quarter of a wavelength in a wavelength region of visible light. Here, the retardation of a wavelength x (nm) is denoted by R(x) (nm). That is, in the ¼ retardation film, ideal values of the wavelength R(400), R(500), and R(600) (nm) are as follows.

$$R(400)=400/4=100 \tag{6}$$

$$R(500)=500/4=125 \tag{7}$$

$$R(600)=600/4=150 \tag{8}$$

When the retardation film satisfying the above equations is used as a retardation film of a reflection type liquid crystal television, it is preferable since a range of wavelength of light leaking is reduced.

However, currently commercially available retardation films are largely deviated from this ideal value, and therefore a method, in which generally, two or more sheets of the retardation films are laminated in such a way that slow axes of the films are not in parallel with one another for the purpose of having the visible light wavelength region close to an ideal value, is employed. When a plurality of the retardation films is used in a laminate, it is preferable to provide a constant retardation independently from an incident wavelength as shown in the following equations (9) and (10). The retardation film close to the equations (9) and (10) is expressed as "wavelength dispersion is small", and particularly in the case where a plurality of the retardation films are used in a laminate, it is expressed as "superior in the wavelength dispersion property".

$$R(400)/R(500)=1.00 \tag{9}$$

$$R(600)R(500)=1.00 \tag{10}$$

Herein, the cases of R(400), R(500), and R(600) have been described for the sake of simplicity, but herein after, the case of wavelength of 550 nm, retardation R(550), which is most sensitive for human's visibility, and the cases of R(450) and R(650) will be described. That is, when a plurality of the retardation film satisfying or being close to the equations (11) and (12) are used in a laminate, it is expressed as "superior in the wavelength dispersion property".

$$R(450)/R(550)=1.00 \tag{11}$$

$$R(550)/R(650)=1.00 \tag{12}$$

The above examples are preferable aspect in the case where a plurality of the retardation films is used in a laminate, and in order to satisfy all wavelengths with one sheet, that is in order to make a broadband retardation film, it is preferable to satisfy the following equation (13).

$$R(450)/R(550)=450/550=0.818 \tag{13}$$

On the other hand, usual polycarbonate and cyclic polyolefin satisfy the following equation (14). With respect to the wavelength dispersion of the retardation, a case of the following equation (14) is referred to as a normal dispersion.

$$R(450)/R(550)>1 \tag{14}$$

On the other hand, a state of the following equation (15), which is close to idea, is referred to as a reverse dispersion. Further, a value of 0.818 shown in the equation (13) is ideal.

$$R(450)/R(550)<1 \tag{15}$$

In order to reduce the constituent members and laminating cost, a retardation film satisfying the above equation (15) with one sheet is required.

As a molecular design for achieving a reverse dispersion, a molecule has only to have an effect equal to that in the case where multiple sheets of retardation films are laid on top of another in a molecule. For example, when a polymer having a slow axis in a stretching direction, that is, having positive birefringence and a polymer having a fast axis in a stretching direction, that is, having negative birefringence are copolymerized, the same effect as in bonding two species of retardation films to each other in an orthogonal direction is obtained, and reverse dispersion may be attained under a certain condition. In the present invention, one kind of polymer having a cardo structure exhibits an effect equal to the effect of laying two sheets of retardation films on top of another in the two direction of main chain and orthogonal to the main chain, and the reverse dispersion, which is generally difficult except for copolymerization or blending of positively and negatively birefringent polymer, can be attained.

In the chemical formulas (I) and (II), $R^2$ or $R^4$ is independently hydrogen, halogen or a hydrocarbon group having 1 to 3-carbon atom(s). In the polyester having a cardo structure, a combined site by the main chain and the cardo structure, that is, fluorene rings in the chemical formulas (I) and (II) are substantially orthogonal to each other, but by imparting a substituent to $R^2$, $R^4$ or the fluorene ring, an angle may vary and the wavelength dispersion property may be improved. Examples of the substituent imparted to the fluorene ring include aromatic groups such as a phenyl group, a biphenyl group and a naphthyl group, but the substituent is not limited to these groups. Further, as a method for introducing the substituent into the fluorene ring, various methods can be employed. For example, a method, in which 2 and 7 positions of the fluorene are brominated with N-bromosuccinimide and a desired group to be introduced is substituted for this bromine, can be exemplified.

The same is true of the case where a cardo structure is used as $R^1$, $R^3$, $R^5$ and $R^7$ in the chemical formulas (I), (II), (III), and (IV).

Next, the alicyclic structure will be described.

In the chemical formulas (I), (II), (III), and (IV), l+n represents a mole fraction (%) of the alicyclic structure, expressed by $R^1$ and $R^5$, which are derived from dicarboxylic acids or ester-forming derivatives thereof. The alicyclic structure is also preferable because it has small deterioration of the photoelastic coefficient and has an effect of improving the Tg as with the cardo structure. However, an effect of improving the Tg is smaller than that of the cardo structure, and a degree of deterioration of the photoelastic coefficient is lower than that of the cardo structure. Preferably, l+n is at least 10 and at most 100, more preferably at least 50 and at most 100, and furthermore preferably at least 70 and at most 100.

Preferably, $R^6$ and $R^8$ are alicyclic structures such as a spiro glycol residue for the purpose of improving the Tg. On the other hand, when the Tg is adjusted for the purpose of enabling melt film fabrication, they are preferably aliphatic hydrocarbon structure, such as ethylene, having 2 to 4 carbon atoms from the viewpoint of reactivity, ease of availability and preventing of the deterioration of the photoelastic coefficient.

As a raw material of the polyester to be used for the retardation film of the present invention, a material having a cardo structure or an alicyclic structure is preferable, but other components are not particularly limited, and raw materials of common polyester resin can be employed. Examples of dicarboxylic acids or ester-forming derivatives thereof include aromatic dicarboxylic acids such as terephthalic acid, dimethyl terephthalate, isophthalic acid, phthalic acid, 2-methylterephthalic acid, naphthalenedicarboxylic acid, phenylenedioxydicarboxylic acid, 4,4'-diphenyldicarboxylic acid, 4,4'-diphenyletherdicarboxylic acid, 4,4'-diphenylketonedicarboxylic acid, 4,4'-diphenoxyethanedicarboxylic acid, 4,4'-diphenylsulfonedicarboxylic acid and 2,6-naphthalenedicarboxylic acid; alicyclic dicarboxylic acids such as cyclopentanedicarboxylic acid, cyclohexanedicarboxylic acid, dimethyl 1,4-cyclohexanedicarboxylate, decalindicarboxylic acid, dimethyl 2,6-decalindicarboxylate, norbornanedicarboxylic acid, 1,2,3,6-tetrahydrophthalic acid, tricyclodecanedicarboxylic acid, pentacyclododecanedicarboxylic acid, isophorone dicarboxylic acid, 3,9-bis(2-carboxyethyl)2,4,8,10-tetraoxaspiro[5.5]undecane, hexahydroterephthalic acid and hexa hydroisophthalic acid; aliphatic dicarboxylic acid such as tetralindicarboxylic acid, succinic acid, glutaric acid, adipic acid, pimelic acid, suberic acid, azelaic acid, sebacic acid, dodecanedicarboxylic acid, succinic acid, glutaric acid, adipic acid, pimelic acid, suberic acid, azelaic acid, sebacic acid, undecadicarboxylic acid and dodecadicarboxylic acid; trimellitic acid, trimesic acid, pyromellitic acid, tricarballylic acid, and esters of these dicarboxylic acids, acid dihalides, and acid anhydrides.

Examples of the diol components include alicyclic diols such as 1,3-cyclohexanedimethanol, 1,4-cyclohexanedimethanol, 1,2-deca hydronaphthalenedimethanol, 1,3-deca hydronaphthalenedimethanol, 1,4-deca hydronaphthalenedimethanol, 1,5-deca hydronaphthalenedimethanol, 1,6-deca hydronaphthalenedimethanol, 2,7-deca hydronaphthalenedimethanol, tetralindimethanol, norbornanedimethanol, tricyclodecanedimethanol, 5-methylol-5-ethyl-2-(1,1-dimethyl-2-hydroxyethyl)-1,3-dioxane, pentacyclododecanedimethanol and tricyclo[5.2.1.0$^{2,6}$] decanedimethanol; aliphatic diols such as ethylene glycol, trimethylene glycol, 2-methylpropanediol, 1,4-butanediol, 1,5-pentanediol, 1,6-hexanediol, diethylene glycol, triethylene glycol, propylene glycol and neopentyl glycol; alkylene oxide adducts of bisphenols such as 4,4'-(1-methylethylidene)bisphenol, methylenebisphenol (bisphenol F), 4,4'-cyclohexylidenebisphenol (bisphenol Z) and 4,4'-sulfonyl-bisphenol (bisphenol S); and alkyleneoxide adducts of aromatic dihydroxy compounds such as hydroquinone, resorcin, 4,4'-dihydroxybiphenyl, 4,4'-dihydroxydiphenyl ether and 4,4'-dihydroxydiphenyl benzophenone.

A polyester resin for optical use of the present invention contains a phosphorus compound, and an alicyclic component and a fluorene derivative component as constituents, and contains an alkali metal, an alkaline earth metal, a metal component selected from Zn, Co and Mn, and a phosphorus element P, and the contents of these components satisfy a relationship of $1.0 \leq (Ma/2+Mb+Mc)/P \leq 5.0$, wherein Ma is the number of moles of an alkali metal element contained in 1 ton of the polyester resin, Mb is the number of moles of an alkaline earth metal element contained in 1 ton of the polyester resin, Mc is the sum of the number of moles of a zinc element (Zn), a cobalt element (Co) and a manganese element (Mn) contained in 1 ton of the polyester resin, and P is the number of moles of a phosphorus element contained in 1 ton of the polyester resin.

When a ratio of metal components (Ma/2+Mb+Mc) to phosphorus (P) is less than 1.0, a forming/molding property of the polyester for optical use becomes insufficient. When the polyester resin for optical use is formed into a film, it is necessary to bring a molten polyester resin into close contact with a mirror-finished cooling body, and an electrostatic application method is effective for this object. When the ratio M/P is less than 1.0, an electrostatic application property is defective and a molten sheet is hardly brought into close contact with a mirror-finished cooling body. When the molten sheet cannot be brought into close contact, there are tendencies that white turbidity due to crystallization of polyester is induced, a thickness unevenness of the sheet becomes large, or optical anisotropy due to nonuniform cooling is exhibited.

When the ratio M/P is more than 5.0, the heat stability of a polyester resin by virtue of metal components is impaired and this may causes coloring and degradation. Particularly when a film is formed from the polyester resin, the stability in melting repeatedly is important since film chippings are re-charged into an extruder as a raw material. This characteristic is a required characteristic specific to a film in contrast to usual resins for injection molding.

The above-mentioned electrostatic application property can be directly controlled by a volume resistivity (melt resistivity) of the polyester melted. That is, preferably, a value of the melt resistivity at 290° C. is maintained in a range of $5 \times 10^6$ to $2 \times 10^9$ Ω·cm. The melt resistivity is determined by number of charge carriers and mobility, and the above-mentioned the ratio M/P corresponds to the number of charge carriers. The mobility depends on the polyester composition and tends to be generally large when a melting point is low. However, since the polyester resin for optical use of the present invention does not exhibit the melting point in substance, even when the ratios M/P are identical to one another, the value of the melt resistivity varies with the composition of the polyester.

The polyester resin for optical use of the present invention contains an alkali metal element, an alkaline earth metal element, and an element selected from Zn, Co and Mn as a metal component, and in the case of the alkali metal element, K is preferable since Na is apt to discolor the polyester resin yellow. In the case of the alkaline earth metal element, Mg is preferable since Ga is apt to form extraneous substances. Among Zn, Co and Mn, Mn is preferable from the viewpoint of extraneous substances and color tone. Among these elements, Mg and Mn are preferable from the viewpoint of the transparency of resin, and Mn is particularly preferable.

The above-mentioned various metal elements can be introduced into a resin in the form of a metal compound, but this may also serves as transesterification reaction catalyst. Particularly, Mn has high activity in the transesterification reaction and is preferable. Preferable, the metal compound is soluble in the polyester, and hydroxide, chloride and acetic salt are preferable, and acetic salt is particularly preferable.

A phosphorus compound is not particularly limited, and examples of the compounds include phosphoric based, phosphorous based, phosphonic based, and phosphinic based compounds. Among others, ester compounds thereof are preferable from the viewpoint of inhibiting the formation of extraneous substances. Particularly, phosphonic acid derivatives consisting of phosphonic based esters are preferable from the viewpoint of inhibiting the formation of extraneous substances and heat resistance in melting repeatedly, and specifically, triethylphosphonoacetate is preferable.

In order to enhance the heat resistance in melting polyester repeatedly, preferably, a trivalent phosphorus compound (a phosphorus element contained in a phosphorus compound is trivalent) is used. Specific examples of the trivalent phosphorus compounds include tris(2,4-di-tert-butylphenyl)phosphate, bis[2,4-bis(1,1-dimethylethyl)-6-methylphenyl]ethyl ester of phosphorous acid, tetrakis[2,4-di-tert-butylphenyl][1,1-b]phenyl]-4,4'-diyl bisphosphonite, bis(2,4-tert-butylphenyl)pentaerythritolphosphite, bis(2,4-dicumylphenyl)pentaerythritoldiphosphite, and bis(2,6-di-tert-butyl-4-methylphenyl)pentaerythritol-diphosphite, and these phosphorus compounds are commercially available from Ciba Specialty Chemicals K.K. under the trade name "IRGAFOS" and from Asahi Denka Co., Ltd. under the trade name "ADK STAB". These phosphorus compounds may be used in place of the above-mentioned triethylphosphonoacetate, or may be used in combination with triethylphosphonoacetate.

The polyester resin for optical use of the present invention has stable heat resistance in repeated melting, but when the inherent viscosity in melting the polyester resin at 290° C. for 20 minutes and then quenching it is denoted by η2 and the inherent viscosity measured before performing the above-mentioned melting is denoted by η1, preferably, the difference thereof Δη=η1−η2 is 0.1 or less. If the polyester resin has such a characteristic, a film of high quality can be obtained even when the polyester resin is repeatedly melted in fabricating a film.

In the polyester resin for optical use of the present invention, preferably, a solution haze, which is obtained by measuring a solution formed by dissolving 2 g of a polyester resin in 20 ml of a mixed solvent composed of phenol and 1,1,2,2-tetrachloroethane in proportions of 3:2 (by volume), and using a cell with an optical path length of 20 mm, is 4% or less, and particularly preferably is 2% or less. When the solution haze is more than 4%, fine extraneous substances may be formed in the polyester resin. The solution haze of the polyester resin for optical use is susceptible to catalyst composition, and therefore it is preferable to maintain the above-mentioned M/P within the range of the present invention.

A method for producing a polyester resin to be used for the retardation film of the present invention is not particularly limited, and various methods can be applied. Examples of these methods include melt polymerization processes such as a transesterification method and a direct esterification method, and solution polymerization processes.

In the case of the transesterification method, as raw materials, for example, dimethyl terephthalate, dimethyl cyclohexanedicarboxylate, 9,9-bis(4-hydroxyethoxyphenyl)fluorine, ethylene glycol, spiro glycol, stearyl alcohol, and polyether modified silicone oil are charged into a reaction vessel so as to become a predetermined polymer composition. In this time, if ethylene glycol is added 1.7 to 2.3 times by mol excess to the total dicarboxylic acid components, reactivity becomes good. These components are melted at about 150° C. and then manganese acetate is added. These monomer components become a homogeneous molten liquid at 150° C.: Next, an internal temperature of the reaction vessel is raised to 235° C. to distill methanol to perform a transesterification reaction. In addition, in the present invention, the transesterification reaction hardly proceeds in the case where a reaction temperature is not higher than that of common polyethylene terephthalate (PET). Therefore, it is preferable to initiate the transesterification reaction at temperatures of 200 to 220° C., and it is preferable to raise the transesterification reaction temperature to 220 to 235° C. after a reaction ratio exceeds about 50%.

After the transesterification reaction is thus terminated, triethylphosphonoacetate is added, and the resulting mixture is stirred well and then an ethylene glycol solution containing germanium dioxide is added.

In addition, the trivalent phosphorus compound may be added simultaneously with the addition of triethylphosphonoacetate.

After the completion of catalyst addition, a reactant is charged into a polymerization equipment, an internal pressure of the polymerization equipment is reduced from a normal pressure to 133 Pa or less while gradually raising an internal temperature of the equipment to 285° C. As a polymerization reaction is advanced, the viscosity of the reactant increases. The reaction is terminated at the time when a stirring torque reaches a predetermined level, and polyester is discharged from the polymerization equipment into a water bath. The discharged polyester is quenched in the water bath and formed into the form of a chip with a cutter.

The obtained polyester is charged into a water bath filled with hot water of 95° C. and is subjected to a water treatment for 5 hours. Water is removed from the polyester by using a dehydrator and fines are also removed.

A polyester resin for optical use can be obtained in this way, but the above description is an example and the method for producing the polyester resin for optical use is not limited to this example.

For a transesterification catalyst, an esterification catalyst, an anti-etherizing agent, a polycondensation catalyst to be used for polymerization, various stabilizers such as heat stabilizer and light stabilizer, and a polymerization adjustment agent, various substances can be employed. Examples of the transesterification catalyst include compounds of magnesium, manganese, cobalt, zinc, titanium, and calcium, and examples of the esterification catalyst include compounds of magnesium, manganese, cobalt, zinc, titanium, and calcium, and examples of an anti-etherification agent include amine compounds.

A polycondensation catalyst is not particularly limited, and various catalysts can be used. Examples of the polycondensation catalysts include germanium compounds such as germanium dioxide, germanium hydroxide, germanium oxalate, germanium tetraethoxide and germanium tetra-n-buthoxide, antimony compounds such as antimony trioxide, antimony acetate and antimony ethyleneglycolate, and titanium compounds such as tetra-n-propyltitanate, tetra-1-propyltitanate, tetra-n-butyltitanate, titanium oxalate and titanium potassium oxalate. These compounds may be used alone or in combination of two or more species. It is also effective to add various phosphorus compounds such as trimethyl phosphate, triethyl phosphate, ethyl acid phosphate, triphenyl phosphate, phosphorous acid, trimethyl phosphite, and trimethyl phosphite as a heat stabilizer. As for the polymerization catalyst, preferably, a Ti, a Sb, or a Ge compound is used as polymerization catalyst when the polyester resin for optical use is formed by polymerization, and, preferably, the contents of the respective elements in the resin satisfy the following equations (16) to (18):

$$0 \leq Ti < 1 \quad (16)$$

$$0 \leq Sb < 3.0 \quad (17)$$

$$0 < Ge < 7 \quad (18),$$

wherein Ti is the number of moles of a titanium element contained in 1 ton of the polyester resin, Sb is the number of moles of an antimony element contained in 1 ton of the polyester resin, and Ge is the number of moles of a germanium element contained in 1 ton of the polyester resin.

These catalysts may be selectively used or may be used in combination in accordance with characteristics required of the polyester resin. For example, though Ti has strong catalyst activity and high productivity for the polyester, it tends to color. Sb has balanced characteristics, but Sb metal particles tend to deposit and tend to impair the transparency of the polyester resin. The Ge is an expensive metal for catalyst, but it is most preferable for the polyester resin for optical use. As a Ge catalyst, a solution prepared by dissolving crystalline germanium dioxide in ethylene glycol is preferable.

When the Ge compound is used as the polymerization catalyst, preferably, the polyester in which the polymerization is terminated is subjected to a water treatment. The water treatment refers to a treatment in which polyester chips are exposed to hot water or steam of a temperature of 50 to 120° C. for 10 minutes to 10 hours, and the Ge catalyst can be deactivated by the water treatment. Deactivation of the Ge catalyst is preferable since the heat stability in melting polyester repeatedly is improved.

When the polyester resin for optical use is subjected to a water treatment, preferably, substances consisting of polyester in film form or needle form or powder form (these are referred to as fines), which are mixed in the polyester chips, are removed. Preferably, the content of fines is 200 ppm or less. Fines are generated in cutting or transporting the polyester chips, but the melting point of the fine is apt to increase by highly crystallizing. When the chips mixed with such fines are subjected to melt film fabrication, unmelted fines are mixed in a film as extraneous substances and cause defects of the film such as fish eye.

When the content of fines is more than 200 ppm, the above-mentioned defects tends to occur. Removal of fines can be performed by water washing the polyester chips. In water washing, a method for showering the polyester chips and a method in which the chips are charged into a water bath, stirred and dehydrated can be adopted. Preferably, water used for water washing is water not containing extraneous substances or ion ingredients, such as pure water and ion-exchange water.

The polyester resin for optical use described above can be preferably used for the retardation film.

To the retardation film of the present invention, additives such as a surface forming agent, a processability improver, an antioxidant, an ultra violet absorber, a light stabilizer, an antistatic agent, a lubricant, an anti-blocking agent, an anti-cloud agent, a nucleic agent, a plasticizer, a coloring agent, a dispersant, an infrared absorber, and filler can be added.

Additives may be color less or colored, but, preferably, it is clear and color less in order not to impair the feature of the retardation film of the present invention. Examples of the additives as inorganic particle for the purpose of forming the surface include $SiO_2$, $TiO_2$, $Al_2O_3$, $CaSO_4$, $BaSO_4$, $CaCO_3$, carbon black, carbon nano tube, fullerene, zeolite, and other metal powder. Examples of preferable organic particle include particles composed of organic polymer such as crosslinked polyvinylbenzene, crosslinked acryl, crosslinked polystyrene, polyester particle, polyimide particle, polyamide particle, and fluororesin particle, or inorganic particle provided with a coat of organic polymer on the surface.

In addition, it is also possible to add dichromatic dye to the above-mentioned retardation film of the present invention to form a polarizing film.

For film fabrication of the retardation film of the present invention, various methods can be used. That is, production methods such as an inflation method, a T-die method, a calendering method, a cutting method, a casting method, an emulsion method, and a hot pressing method can be used, and preferably, the inflation method, the T-die method, the casting method and the hot pressing method can be used. In the case of production methods by the inflation method or the T-die method, an extruder type melt extruding apparatus with a monoaxial or biaxial extruding screw can be used. A biaxial kneading extruder, of which an L/D ratio is preferably 25 or more and 120 or less, is preferable to prevent coloring. When melting and kneading are performed using the melt extruding apparatus, it is preferable to melt and knead under a reduced pressure by using a vent or under a nitrogen gas stream from the viewpoint of inhibiting coloring. A non-stretched film can be obtained by the casting method in which a molten resin is metered with a gear pump and then discharged from a T-die, and the discharged molten resin is brought into close contact with the surface of a cooling medium such as a cooled drum by an electrostatic charged method, an air chamber method, an air knife method, or a press roll method, which is means for bringing into close contact, and is cooled and solidified, and further quenched to room temperature.

In addition, when a non-stretched film is produced by a casting method, solvents such as tetra hydrofuran, acetone, methyl ethyl ketone, dimethylformamide, dimethyl sulfoxide, and N-methyl-pyrrolidone can be used, and, preferably, acetone, methyl ethyl ketone, or N-methyl-pyrrolidone can be used. This film can be produced by employing a dry method in which the polyester composition of the present invention was dissolved in the foregoing one or more solvents, and the resulting solution is casted on a flat plate or a curved plate (roll) of a heat resistant film such as polyethylene terephthalate, a steel belt, or metal foil using a bar coater, a T-die, a T-die with a bar, or a die coat, and the solvent is distilled off, or a wet method for solidifying the solution with a solidifying agent.

The retardation film is obtained by further stretching the film through monoaxial stretching, biaxial stretching and/or stretching in a thickness direction. A stretching technique of the biaxial stretching is not particularly limited, and a successive biaxial stretching method and a simultaneous biaxial stretching method can be employed. When stretching is conducted by a simultaneous biaxial stretching method, for example, a method, in which the simultaneous biaxial stretching is performed with a tenter based on a drive system using a linear motor (such as a method described in Japanese Unexamined Patent Publication No. 63-12772), is preferable, but it is not particularly limited, and a chain-drive system, a screw system, and a pantograph system can be employed for a drive system of a clip to grasp a film. Preferably, a temperature of the simultaneous biaxial stretching is at least a glass transition temperature Tg of polyester, and at most a glass transition temperature Tg of polyester plus 50° C. A stretching temperature out of this range makes uniform stretching hard and easily causes increased thickness unevenness and film break. A drawing ratio is not particularly limited, and it may be appropriately determined in accordance with the aimed retardation. A stretching speed is not particularly limited, but a speed of 100 to 50000%/min is preferable.

As for a method of stretching in a thickness direction, a film can be stretched by a method in which a film to be stretched is allowed to adhere to a process film having a large thermal shrinkage and this laminate is heat treated.

In addition, when a film is stretched by successive biaxial stretching, the resulting non-oriented film is brought into contact with a group of rolls heated to at least a glass transition temperature Tg of polyester minus 30° C. and at most a glass transition temperature Tg of polyester plus 50° C. to be heated, and is stretched by 1.1 to 10 times in a longitudinal direction, and the stretched film is cooled once. Thereafter, this film is clamped at ends with a tenter clip and is stretched by 1.1 to 10 times in a width direction in an atmosphere of at least a glass transition temperature Tg of polyester plus 5° C. and a glass transition temperature Tg of polyester plus 50° C. to obtain a biaxially oriented polyester resin film.

When a film is stretched by successive biaxial stretching, preferably, the film is stretched with a cover film laminated to at least one side of the film for the purpose of reducing flaws due to the contact of a roll with the film. As the cover film, films of various resins can be used. Specific examples of the cover film include a polyolefin film, a polyester film, and the like. Particularly preferable film is a polypropylene film and/or a polyethylene naphthalate film.

Preferably, a thickness of the retardation film of the present invention is 0.01 μm to 10 mm, more preferably is 5 μm to 100 μm, and furthermore preferably is 10 μm to 30 μm. When the thickness of the film is more than 10 mm, light transmission may be deteriorated. When the film thickness is less than 0.01 μm, for example, processability may be deteriorated.

Hereinafter, the present invention will be described in more detail by way of examples.

Herein, methods for measuring properties and methods for evaluating effects were performed according to the following methods.

(1) Photoelastic Coefficient

Photoelastic coefficient (unit: $10^{-12}$ $Pa^{-1}$)

A sample having a size of 1 cm in short side and 7 cm in long side was cut out. A thickness of this sample was denoted by d (μm). This sample was clamped by 1 cm at upper and lower edges with sample supporting members and a tensile force (F) was applied to this sample by 1 kg/mm² ($9.81 \times 10^6$ Pa) in a direction of a long side using a transducer U3C1-5K manufactured by Shimadzu Corp. In this state, a retardation R (nm) was measured using a polarizing microscope 5892 manufactured by NIKON Corp. As a light source, Sodium D-lines (589 nm) were used. Applying these values to photoelastic coefficient=R/(d×F), the photoelastic coefficient was determined.

(2) Refractive Index

The refractive index was measured with the following measuring apparatus according to JIS K 7105 (1981) (measuring range: up to 1.87).

Apparatus: Abbe refractometer 4T (manufactured by ATAGO Co., Ltd.)
Light source: Sodium D-lines
Measuring temperature: 25° C.
Measuring humidity: 65% RH
Mounting liquid: Methylene iodide When the refractive index is more than 1.87, measurement can be conducted by the following method. In this case, the result of measurement at 590 nm is considered as a refractive index in Sodium D-lines.

Technique: Ellipsometry
Apparatus: Retardation measuring apparatus NPDM-1000 (manufactured by NIKON Corp.)
Light source: Halogen lamp
Detector: Si—Ge
Polarizer: Glan-Thompson
Number of rotations of polarizer: two-revolution
Incident angle: 45° to 80°, 0°
Measuring wavelength: 590 nm (3) Glass Transition Temperature (Tg)

Apparatus: Robot type DSC RDC 220 (manufactured by Seiko Instrument Inc.)
Temperature raising speed: 10° C./min
Glass transition temperature (Tg): A point of inflection of a DSC curve is considered as Tg.

(4) Retardation

Measurement was conducted using the following measuring apparatus.

Apparatus: Automatic birefringence analyzer manufactured by Oji Scientific Instruments (KOBRA-21ADH)
Measuring diameter: 5 mm
Measuring wavelength: 480.4 nm, 548.3 nm, 628.2 nm, 752.7 nm Retardation pf wavelengths other than measuring wavelength: Using R(480.4), R(548.3), R(628.2), and R(752.7) coefficients a to d in the following Cauchy's wavelength dispersion equation:

$$R(\lambda)=a+b/\lambda^2+c/\lambda^4+d/\lambda^6$$

were determined and the retardation was determined by substituting a desired wavelength into this Cauchy's wavelength dispersion equation.

(5) Difference Between Refractive Indexes (ny–nz)

Measurement was conducted using the following measuring apparatus.

Apparatus: Automatic birefringence analyzer manufactured by Oji Scientific Instruments (KOBRA-21ADH)
Measuring diameter: 5 mm
Measuring wavelength: 590 nm (6) Quantification of Metal Element and Phosphorus Element Contained in Polyester Resin Metal elements other than the alkali metal element and a phosphorus element were measured with an X-ray fluorescence element analyzer (manufactured by Rigaku Corp., ZSX-100e type) and the contents of them were determined using a calibration curve made in advance.

(7) Quantification of Alkali Metal Element Contained in Polyester Resin

A polyester resin was measured by an atomic adsorption method with an atomic adsorption spectrophotometer (manufactured by Shimadzu Corp., AA-6300) (flame: acetylene-air) and the content of an alkali metal element was determined using a calibration curve made in advance.

(8) Melt Resistivity of Polyester Resin

A polyester resin is dried under a reduced pressure at a temperature of 60 to 100° C. for 24 hours or more. Thereafter, the polyester resin is melted at 290° C. under nitrogen gas stream in a glass test tube. A pair of electrodes is inserted into this molten polyester. A voltage was applied between the electrodes, and the melt resistivity value of polyester was determined from the following equation based on the observed current value.

$$\text{Melt resistivity}(\Omega\cdot\text{cm})=(V\times S)/(I\times D)$$

V: applied voltage (V), S: electrode area ($cm^2$), I: current value (A),
D: distance between electrodes (cm)

(9) Δη of Polyester Resin

A polyester resin is dried under a reduced pressure at a temperature of 60 to 100° C. for 24 hours or more. Thereafter, the polyester resin is melted at 290° C. for 20 minutes under nitrogen gas stream in a glass test tube. After melting, the polyester resin is discharged into water and quenched. The inherent viscosity of the polyester resin measured before melting is denoted by η1, and the inherent viscosity of the polyester resin measured after melting and quenching is denoted by η2, and Δη was determined from (η1–η2).

In addition, the inherent viscosity was measured at 25° C. using o-chlorophenol as a solvent.

(10) Solution Haze of Polyester Resin 2 g of polyester was dissolved in 20 ml of a mixed solvent composed of phenol and 1,1,2,2-tetrachloroethane in proportions of 3:2 (by volume), and the solution haze was analyzed by integrating sphere type photoelectric photometry with a haze meter (manufactured by SUGA TEST INSTRUMENTS Co., Ltd., HGM-2DP) using a cell with an optical path length of 20 mm.

(11) Fine Content 20 kg of polyester chips were sifted through a sieve with a nominal 2 mm mesh based on JIS Z 8801-1 and the fines fallen through the sieve were collected and weighed to determine the fine content.

(12) Casting Property

A molten polyester sheet extruded from an extruder was subjected to electrostatic casting at a speed of 10 m/min, and each film was rated according to the following criteria for the surface conditions of the film.

Symbols ○ and Δ are considered as acceptance and a symbol x is considered as rejection.

○: There is no surface defect due to such as air involved in a film

Δ: There are surface defects due to such as air involved in a film in the vicinity of a film edge, but there is no surface defect in a central portion of a film.

x: Surface defects due to such as air involved in a film are observed also in a central portion of a film.

(13) Fish Eye

A film cut to the size of A4 was placed between polarizing plates orthogonal to each other, and a bright point was observed using a magnifier. Each film was rated according to the following criteria, and symbols ○ and Δ are considered as acceptance and a symbol x is considered as rejection.

○: No fish eye is observed.
Δ: One fish eye is observed.
x: Two or more fish eyes are observed.

Reference Example 1

Preparation of Titanium Catalyst (Titanium Sodium Lactate Chelate Compound)

An lactic acid (226.8 g, 2.52 mol) was dissolved in hot water (371 g) in a three liter flask equipped with a stirrer, a condenser and a thermometer, and the resulting solution was stirred. To the solution being stirred, titanium tetraisopropoxide (288 g, 1.0 mol) was gradually added through a dropping funnel. The resulting mixture was heated and refluxed for 1 hour to produce a hazy solution, and from this hazy solution, a mixture of isopropanol and water was distilled off under a reduced pressure. The resulting product was cooled below 70° C., and to the solution being stirred, a 32% by weight aqueous solution of sodium hydroxide (380 g, 3.04 mol) was gradually added through a dropping funnel. The resulting product was filtrated and then it was mixed with ethylene glycol (504 g, 8 mol), and isopropanol and water were removed by heating under a reduced pressure to obtain a product (titanium content 5.6% by weight), which is slightly hazy and is colored in light yellow.

Example 1

With respect to 1 mole of 1,4-cyclohexanedicarboxylic acid dimethyl ester, 0.4 moles of 9,9-bis(4-hydroxyethoxyphenyl)fluorine and 2.2 moles of ethylene glycol were used as raw materials, and 0.0005 moles of calcium acetate and 0.00004 moles of manganese acetate were used as catalysts, and these substances were charged into a reaction bath. The resulting mixture was gradually heated from 190° C. to 245° C. according to a normal method while stirring the mixture to perform a transesterification reaction. After a predetermined amount of methanol was drawn-out of a system, 0.0012 moles of germanium oxide being a polymerization catalyst and 0.0015 moles of trimethyl phosphate for preventing coloring were charged, and raising of a temperature and reducing of a pressure of the resulting mixture were gradually performed to bring a heating bath into a temperature of 290° C. and a degree of vacuum of 1 torr or less while discharging the produced ethylene glycol out of a system. These conditions were maintained until viscosity increases and the reaction was completed after a lapse of 2 hours. A reactant was extruded into water to obtain pellets.

The pellets were pressed at 220° C. to obtain a film with a thickness of 120 μm. The obtained film was stretched by 2.5 times at 100° C. to obtain a retardation film having a thickness of 155 μm and retardation R (550)=406 nm. It was found from this result that the retardation film of Example 1 can be fabricated through the melt film fabrication which does not require a solvent cost and a solvent recovery cost and can be fabricated at low cost.

Examples 2 to 30, Comparative Examples 1 to 8

Each film was obtained in the same manner as in Example 1 except for changing raw material composition.

The results of measurements are shown in Table 1.

In addition, structures of the raw materials used in each Example and Comparative Example are as follows.

A: BBAF dimethyl ester (BBAF produced by JFE Chemical Corp. was esterified)

B: Dimethyl 1,4-cyclohexanedicarboxylate (produced by Wako Pure Chemical Industries, Ltd.)
  Ba: A ratio of a cis form to a trans form (weight ratio) is 70/30
  Bb: A ratio of a cis form to a trans form (weight ratio) is 30/70

C: Dimethyl 2,6-decalindicarboxylate (produced by MITSUBISHI GAS CHEMICAL Co., Inc.)

D: Dimethyl terephthalate (produced by Wako Pure Chemical Industries, Ltd.)

E: 1,2,3,6-tetrahydrophthalic acid (produced by Tokyo Chemical Industrial Co., Ltd.)

F: BPEF (produced by JFE Chemical Corp.)

G: Spiro glycol (produced by JAPAN HYDRAZINE Co., Inc.)

H: 1,4-cyclohexanedimethanol (produced by Tokyo Chemical Industrial Co., Ltd.)

I: Tricyclo[$5.2.1.0^{2,6}$]decanedimethanol (produced by Tokyo Chemical Industrial Co., Ltd.)

J: Ethylene glycol (produced by Wako Pure Chemical Industries, Ltd.)

[Formula 10]

Comparative Example 9

As a polycarbonate retardation film, pellets of polybisphenol A carbonate (produced by Aldrich Chemical Co., molecular weight 64,000) were pressed at 220° C., 260° C. and 300° C., but good films could not be obtained. It was evident that it is difficult to produce the polycarbonate retardation film through melt film fabrication.

Next, on the polymers in Examples 31 to 43 and Comparative Examples 10 and 11, which have the same composition as in Example 28, polymerization catalysts, species of metals, phosphorus compounds, and water treatments and polymer physical properties were compared.

Example 31

Synthesis of Polyester 32.2 parts by weight of dimethyl 1,4-cyclohexanedicarboxylate in which a ratio of a cis form to a trans form (weight ratio) is 70/30, 7.8 parts by weight of dimethyl terephthalate, 25 parts by weight of ethylene glycol, 70.4 parts by weight of 9,9-bis(4-hydroxyethoxyphenyl)fluorine, and 0.06 parts by weight of manganese acetate tetrahydrate were respectively metered and charged into an transesterification reaction equipment, and the contents of the reaction equipment were dissolved at 150° C. and stirred.

A temperature of the contents of the reactant was raised to 205° C. while stirring the contents, and further gradually raised to 235° C. to distill methanol. After a predetermined amount of methanol was distilled, an ethylene glycol solution containing 0.032 parts by weight of triethylphosphonoacetate was added. After a lapse of five minutes from the addition of triethylphosphonoacetate, an ethylene glycol solution containing 0.04 parts by weight of germanium dioxide was added, and the resulting mixture was stirred further for 10 minutes to terminate a transesterification reaction. Thereafter, a transesterification reactant was shifted to polymerization equipment.

Next, a pressure of the contents of the polymerization equipment was reduced and a temperature thereof was raised while stirring the contents of the polymerization equipment to perform polymerization while distilling ethylene glycol. The pressure of the polymerization equipment was reduced from a normal pressure to 133 Pa or less over 90 minutes, and the temperature was raised from 235° C. to 285° C. over 90 minutes.

Once a stirring torque of the polymerization equipment reached a predetermined value, the internal pressure of the polymerization equipment was returned to a normal pressure by introducing a nitrogen gas, and a valve at a lower section of the polymerization equipment was opened to discharge a polymer in gut form into a water bath. The gut-like polyester cooled in the water bath was cut with a cutter to form chips.

Polyester chips were obtained in this way.

(Water Treatment of Polyester)

The obtained polyester chips were charged into a water bath filled with ion-exchange water of 95° C. and was subjected to a water treatment for 5 hours. The polyester chips subjected to a water treatment were separated from water with a dehydrator. Fines contained in the polyester chips were also removed by this water treatment.

(Film Fabrication of Polyester Film)

The polyester chips were dried under a reduced pressure and then supplied to an extruder. The polyester supplied to an extruder was melted at 280° C., filtrated with a metal nonwoven fabric, and extruded from a T-die into the shape of a molten sheet. This molten sheet was cooled and solidified on a mirror-finished drum in which a surface temperature is controlled at 25° C. by an electrostatic application method (a tungsten wire with a diameter of 0.15 mm was used as an electrode) to prepare a non-stretched film.

Furthermore, the non-stretched film was stretched by three times in a longitudinal direction with a roll drawing machine heated to a temperature of Tg+10° C. to obtain a monoaxial stretched film.

The results are shown in Tables 2 and 3.

Example 32

A polyester chip and a polyester film were obtained in the same manner as in Example 31 except that the water treatment was not performed. The results of measurements are shown in Tables 2 and 3, but since the water treatment was not performed, an activity of the Ge catalyst remained and $\Delta\eta$ increased. Although the fine content fell within an acceptable range, since the fines were not removed, a value of a solution haze became high a little and fish eyes were also found.

Example 33

A phosphorus compound in Example 32 was changed from triethylphosphonoacetate to "ADK STAB PEP-36" produced by Asahi Denka Co., Ltd., and ADK STAB PEP-36 was added in such a way that an amount of remaining phosphorus is equal to that in Example 31. A polyester chip and a polyester film were obtained in the same manner as in Example 31 except for changing the phosphorus compound. The results are shown in Tables 2 and 3. The $\Delta\eta$ was improved by the trivalent phosphorus compound, but a value of the melt resistivity of the polyester resin increased.

Examples 34 and 35

The phosphorus compound in Example 31 was changed from triethylphosphonoacetate to trimethyl phosphate and phosphoric acid, respectively, and these phosphorus compounds were added in such a way that an amount of remaining phosphorus is equal to that in Example 31. A polyester chip and a polyester film were obtained in the same manner as in Example 31 except for changing the phosphorus compound. The results are shown in Tables 2 and 3. A value of a solution haze was small in the ester-based phosphorus compound, but a value of a solution haze was increased in the phosphoric acid-based phosphorus compound.

Examples 36 and 37

A polyester chip and a polyester film were obtained in the same manner as in Example 31 except for changing an amount of triethylphosphonoacetate added in Example 31. The results are shown in Tables 2 and 3.

When a ratio of metal to phosphorus was small, a value of the melt resistivity increased and a casting property was deteriorated. On the other hand, when a ratio of metal to phosphorus was large, $\Delta\eta$ and a value of a solution haze increased and fish eyes were also observed. In addition, in the polyester having a large ratio of metal to phosphorus, phenomena that melt viscosity was lowered and a film width became narrow in performing melt film fabrication were observed.

Examples 38 and 39

The manganese acetate tetrahydrate (transesterification reaction catalyst) in Example 31 was changed to magnesium acetate tetrahydrate and calcium acetate monohydrate. An amount of the catalyst to be added was adjusted in such a way that a reaction time of the transesterification reaction was similar to that in Example 31. Further, an amount of triethylphosphonoacetate to be added was adjusted in such a way that the ratio of metal to phosphorus was similar to that in Example 31. A polyester chip and a polyester film were obtained in the same manner as in Example 31 except for changing the above-mentioned amounts of addition. The results are shown in Tables 2 and 3.

When magnesium was used, the melt resistivity of the polyester was effectively reduced, but $\Delta\eta$ was deteriorated a little because of an increase in an amount of metal. When calcium was used, the volume resistivity was increased and the value of a solution haze was also increased.

Examples 40 and 41

A polyester chip and a polyester film were obtained in the same manner as in Example 31 except for changing the polymerization catalyst in Example 31 from germanium dioxide to antimony trioxide and a titanium sodium lactate chelate (prepared in Reference Example), respectively. The results are shown in Tables 2 and 3.

When the antimony catalyst was used, it took much time to perform the polymerization, and the value of a solution haze of the resulting polyester was also increased. When the titanium catalyst was used, the polymerization time was most short, and the reactivity was excellent. However, in the case of the titanium catalyst, the color tone of the polyester took on a yellow tinge. In addition, in any case of the antimony catalyst and the titanium catalyst, an effect of deactivating the catalyst due to the water treatment was small, and $\Delta\eta$ became larger than that of the germanium catalyst.

Examples 42 and 43

A polyester chip and a polyester film were obtained in the same manner as in Example 31 except for changing an amount of germanium dioxide being a polymerization catalyst used. The results are shown in Tables 2 and 3. When the amount of the polymerization catalyst was increased, the value of a solution haze was increased and the fish eyes were apt to be produced.

Comparative Examples 10 and 11

A polyester chip and a polyester film were obtained in the same manner as in Example 31 except for changing an amount of triethylphosphonoacetate added. When a ratio of metal to phosphorus was too small, an electrostatic application property was deteriorated, and therefore air was involved in the film in casting the film and many foam-like defects were produced on the surface (the side facing the mirror-finished drum) of the film. On the other hand, when a ratio of metal to phosphorus was too large, nonuniform electric discharge was generated from a wire electrode to the molten film and streak-like defects were produced on the surface (the side facing the mirror-finished drum) of the film. Further, Δη of the polyester was large and the discharge of the molten sheet was unstable.

TABLE 1

| | Composition | | | | | | | | | | |
|---|---|---|---|---|---|---|---|---|---|---|---|
| | Dicarboxylic acid component | | | | | Diol component | | | | | |
| | Cardo structure | Alicyclic structure | | Others | | Cardo structure | Alicyclic structure | | Others | | Photoelastic |
| | A mol % | Ba mol % | Bb mol % | C mol % | D mol % | E mol % | F mol % | G mol % | H mol % | I mol % | J mol % | coefficient ×10⁻¹²/Pa |

| | A | Ba | Bb | C | D | E | F | G | H | I | J | Photoelastic coeff. |
|---|---|---|---|---|---|---|---|---|---|---|---|---|
| Example 1 | | 100 | | | | | 40 | | | | 60 | 31 |
| Example 2 | 50 | 40 | | | 10 | | | | | 20 | 80 | 12 |
| Example 3 | 50 | 40 | | | 10 | | | | | | 100 | 15 |
| Example 4 | | | | 100 | | | 40 | 60 | | | | 18 |
| Example 5 | | | | 80 | | 20 | 60 | | | | 40 | 22 |
| Example 6 | | | | 100 | | | 60 | 40 | | | | 23 |
| Example 7 | | | | 60 | | 40 | 60 | | | | 40 | 24 |
| Example 8 | | 100 | | | | | 40 | 60 | | | | 25 |
| Example 9 | | 100 | | | | | 34 | | | 66 | | 26 |
| Example 10 | | | | 80 | | 20 | 90 | | | | 10 | 26 |
| Example 11 | | | | 80 | | 20 | 80 | | | | 20 | 26 |
| Example 12 | | 100 | | | | | 80 | | | | 20 | 27 |
| Example 13 | | 100 | | | | | 40 | 60 | | | | 27 |
| Example 14 | | | | 60 | | 40 | 80 | | | | 20 | 27 |
| Example 15 | | 100 | | | | | 40 | | | 60 | | 28 |
| Example 16 | | 20 | | | | 80 | 80 | | | | 20 | 28 |
| Example 17 | | 100 | | | | | 40 | | 60 | | | 29 |
| Example 18 | | 100 | | | | | 40 | | 60 | | | 29 |
| Example 19 | | 50 | | | | 50 | 80 | | | | 20 | 29 |
| Example 20 | | 100 | | | | | 60 | 40 | | | | 36 |
| Example 21 | | 100 | | | | | 60 | 20 | | | 20 | 31 |
| Example 22 | | 90 | | | 10 | | 60 | 20 | | | 20 | 31 |
| Example 23 | | 80 | | | | 20 | 80 | | | | 20 | 31 |
| Example 24 | | 70 | | | | 30 | 70 | | | | 30 | 31 |
| Example 25 | | | | | 20 | 80 | 80 | | | | 20 | 31 |
| Example 26 | | 70 | | | | 30 | 80 | | | | 20 | 32 |
| Example 27 | | 80 | | | | 20 | 80 | | | | 20 | 33 |
| Example 28 | | 80 | | | 20 | | 80 | | | | 20 | 34 |
| Example 29 | | | | | 20 | 80 | 80 | | | | 20 | 35 |
| Example 30 | | | 100 | | | | 40 | | | | 60 | 37 |
| Comparative Example 1 | | 80 | | | 20 | | 80 | | | | 20 | 43 |
| Comparative Example 2 | | | | | 50 | 50 | 80 | | | | 20 | 46 |
| Comparative Example 3 | | 50 | | | | 50 | 80 | | | | 20 | 49 |
| Comparative Example 4 | | 50 | | | | 50 | 50 | | | | 50 | 52 |
| Comparative Example 5 | | | | | 100 | | 100 | | | | | 63 |
| Comparative Example 6 | | 20 | | | | 80 | 50 | | | | 50 | 66 |
| Comparative Example 7 | | 50 | | | | 50 | | | | | 100 | 70 |
| Comparative Example 8 | | | | | 100 | | | | | | 100 | 87 |
| Comparative Example 9 | | | | | | | | | | | | |

| | Difference between refractive indexes ny − nz | Tg ° C. | Melt film fabrication | Ar(y)/Ar(x) | Stretching Temperature ° C. | Draw ratio Times | Thickness μm | Re(550) nm | R(450)/R(550) |
|---|---|---|---|---|---|---|---|---|---|
| Example 1 | 0.00040 | 95 | ○ | 1.00 | 100 | 2.5 | 155 | 406 | 0.95 |
| Example 2 | | 127 | ○ | 0.91 | | | | | |
| Example 3 | | 125 | ○ | 0.91 | | | | | |
| Example 4 | 0.00046 | 121 | ○ | 1.00 | 125 | 3.1 | 168 | 898 | 0.98 |
| Example 5 | | 121 | ○ | 1.00 | 120 | 2.9 | 98 | 346 | 0.86 |
| Example 6 | | 132 | ○ | 1.00 | 145 | Nonuniform | 170 | 217 | 0.9 |
| Example 7 | | 115 | ○ | 1.00 | 110 | 1.9 | 90 | 197 | 0.79 |
| Example 8 | 0.00900 | 101 | ○ | 1.00 | 130 | 2.2 | 158 | 193 | 0.98 |

TABLE 1-continued

|  |  |  |  |  |  |  |  |  |  |
|---|---|---|---|---|---|---|---|---|---|
| Example 9 |  | 101 | ○ | 1.00 | 110 | 4.4 | 146 | 659 | 0.99 |
| Example 10 |  | 135 | ○ | 1.00 | 145 | 3.1 | 91 | 48 | 0.36 |
| Example 11 | 0.00003 | 133 | ○ | 1.00 | 135 | 2.6 | 119 | 201 | 0.73 |
| Example 12 | 0.00400 | 125 | ○ | 1.00 | 140 | 2.0 | 143 | 32 | 0.60 |
| Example 13 | 0.00009 | 105 | ○ | 1.00 | 115 | 1.8 | 158 | 529 | 0.99 |
| Example 14 | −0.00008 | 127 | ○ | 1.00 | 130 | 3.2 | 125 | 147 | 0.59 |
| Example 15 | 0.00005 | 105 | ○ | 1.00 | 115 | 3.6 | 144 | 457 | 0.96 |
| Example 16 | 0.00000 | 116 | ○ | 1.00 | 125 | 3.1 | 132 | 106 | 1.66 |
| Example 17 |  | 108 | ○ | 1.00 |  |  |  |  |  |
| Example 18 |  | 107 | ○ | 1.00 |  |  |  |  |  |
| Example 19 | 0.00013 | 120 | ○ | 1.00 | 130 | 3.4 | 154 | 58 | 2.1 |
| Example 20 | 0.00002 | 111 | ○ | 1.00 | 130 | 2.4 | 142 | 218 | 0.95 |
| Example 21 | 0.00026 | 115 | ○ | 1.00 | 115 | 2.0 | 184 | 331 | 0.81 |
| Example 22 | 0.00013 | 110 | ○ | 0.97 | 130 | 2.5 | 162 | 273 | 0.95 |
| Example 23 | 0.00009 | 122 | ○ | 1.00 | 125 | 2.9 | 81 | 126 | 0.62 |
| Example 24 |  | 115 | ○ | 1.00 | 115 | 2.9 | 131 | 217 | 0.68 |
| Example 25 |  | 117 | ○ | 0.89 | 120 | 3.3 | 173 | 319 | 0.85 |
| Example 26 |  | 124 | ○ | 1.00 | 120 | 2.3 | 103 | 70 | 0.32 |
| Example 27 |  | 120 | ○ | 1.00 |  |  |  |  |  |
| Example 28 | 0.00007 | 131 | ○ | 0.94 | 145 | 2.3 | 170 | 302 | 0.91 |
| Example 29 | 0.00343 | 118 | ○ | 0.89 | 130 | 2.7 | 103 | 69 | 0.73 |
| Example 30 | 0.00100 | 90 | ○ | 1.00 | 100 | 2.0 | 152 | 255 | 0.96 |
| Comparative Example 1 | 0.00008 | 130 | ○ | 0.00 | 140 | 2.7 | 117 | 692 | 0.98 |
| Comparative Example 2 |  | 129 | ○ | 0.76 | 140 | 3.2 | 130 | 547 | 1.03 |
| Comparative Example 3 | 0.00050 | 141 | ○ | 0.48 | 145 | Nonuniform | 150 | 254 | 1.04 |
| Comparative Example 4 | 0.00004 | 120 | ○ | 0.67 | 140 | 5.0 | 90 | 654 | 1.02 |
| Comparative Example 5 | — | 155 | ○ | 0.67 | 175 | 1.1 | 231 | 93 | 0.97 |
| Comparative Example 6 | 0.00010 | 129 | ○ | 0.56 | 135 | Nonuniform | 235 | 420 | 1.07 |
| Comparative Example 7 | 0.00030 | 35 | ○ | 0.00 | 55 | 2.2 | 169 | 741 | 1.05 |
| Comparative Example 8 | 0.00390 | 79 | ○ | 0.00 |  |  | 50 | 3496 | 1.00 |
| Comparative Example 9 |  | 150 | x |  |  |  |  |  |  |

TABLE 2

Species of metal and phosphorus compound and Content of metal and phosphorus element

|  | Ma(species of metal) mol/ton | Mb(species of metal) mol/ton | Mc(species of metal) mol/ton | P(species of compound) mol/ton | Others(species of compound) mol/ton |
|---|---|---|---|---|---|
| Example 31 | 0 | 0 | Mn/2.46 | TEPA/1.16 | Ge/2.75 |
| Example 32 | 0 | 0 | Mn/2.46 | TEPA/1.16 | Ge/2.75 |
| Example 33 | 0 | 0 | Mn/2.46 | PEP36/1.16 | Ge/2.75 |
| Example 34 | 0 | 0 | Mn/2.46 | TMPA/1.16 | Ge/2.75 |
| Example 35 | 0 | 0 | Mn/2.46 | PA/1.16 | Ge/2.75 |
| Example 36 | 0 | 0 | Mn/2.46 | TEPA/2.46 | Ge/2.75 |
| Example 37 | 0 | 0 | Mn/2.46 | TEPA/0.49 | Ge/2.75 |
| Example 38 | 0 | Mg/3.74 | 0 | TEPA/1.76 | Ge/2.75 |
| Example 39 | 0 | Ca/5.12 | 0 | TEPA/2.42 | Ge/2.75 |
| Example 40 | 0 | 0 | Mn/2.46 | TEPA/1.16 | Sb/2.71 |
| Example 41 | Na/0.63 | 0 | Mn/2.46 | TEPA/1.16 | Ti/0.21 |
| Example 42 | 0 | 0 | Mn/2.46 | TEPA/1.16 | Ge/1.3 |
| Example 43 | 0 | 0 | Mn/2.46 | TEPA/1.16 | Ge/6.5 |
| Comparative Example 10 | 0 | 0 | Mn/2.46 | TEPA/3.1 | Ge/2.75 |
| Comparative Example 11 | 0 | 0 | Mn/2.46 | TEPA/0.4 | Ge/2.75 |

Note)
TEPA: Triethylphosphonoacetate
TMPA: Trimethyl phosphate
PA: Phosphoric acid
PEP 36: "ADK STAB PEP-36" produced by Asahi Denka Co., Ltd.
Ma: Alkali metal
Mb: Alkaline earth metal
Mc: Metal selected from Zn, Co, and Mn

TABLE 3

|  | Polymer properties | | | | Sheet properties | |
|---|---|---|---|---|---|---|
|  | $(Ma/2 + Mb + Mc)/P$ | Volume resistivity $M\Omega \cdot cm$ | Dh | Solution haze % | Content of fines ppm | Casting property | Fish eye |
| Example 31 | 2.12 | 20 | 0.02 | 0.5 | 10 | ○ | ○ |
| Example 32 | 2.12 | 20 | 0.06 | 1.5 | 200 | ○ | Δ |
| Example 33 | 2.12 | 50 | 0.01 | 1.0 | 10 | ○ | ○ |
| Example 34 | 2.12 | 20 | 0.03 | 1.0 | 10 | ○ | ○ |
| Example 35 | 2.12 | 30 | 0.03 | 2.5 | 10 | ○ | ○ |
| Example 36 | 1.00 | 500 | 0.01 | 0.5 | 10 | Δ | ○ |
| Example 37 | 5.00 | 5 | 0.10 | 2.0 | 10 | ○ | Δ |
| Example 38 | 2.12 | 10 | 0.03 | 1.0 | 10 | ○ | ○ |
| Example 39 | 2.12 | 40 | 0.02 | 3.0 | 10 | ○ | ○ |
| Example 40 | 2.12 | 20 | 0.04 | 2.5 | 10 | ○ | ○ |
| Example 41 | 2.39 | 10 | 0.07 | 2.0 | 10 | ○ | ○ |
| Example 42 | 2.12 | 20 | 0.02 | 0.5 | 10 | ○ | ○ |
| Example 43 | 2.12 | 20 | 0.10 | 3.0 | 10 | ○ | Δ |
| Comparative Example 10 | 0.80 | 1000 | 0.02 | 0.5 | 10 | x | — |
| Comparative Example 11 | 6.15 | 3 | 0.12 | 2.0 | 10 | x | — |

Note)
$M\Omega \cdot cm = 10^6 \Omega \cdot cm$

The invention claimed is:

1. A retardation film comprising polyester having a photo-elastic coefficient of $18 \times 10^{-12}$ $Pa^{-1}$ to $27 \times 10^{-12}$ $Pa^{-1}$, wherein the polyester includes a structural unit expressed by the chemical formulas (I), (II), (III), or (IV) and wherein the mole fractions (%) of structural units expressed by the chemical formulas (I), (II), (III) and (IV) are denoted by l, m, n, and o, respectively, with l, m, n, and o satisfying the following equations (4) and (5):

$$80 < l+m+n+o \leq 100 \quad (4),$$

and $$10 \leq l+m \leq 100 \quad (5),$$

wherein formulas (I), (II), (III) and (IV) are as follows:

(I)

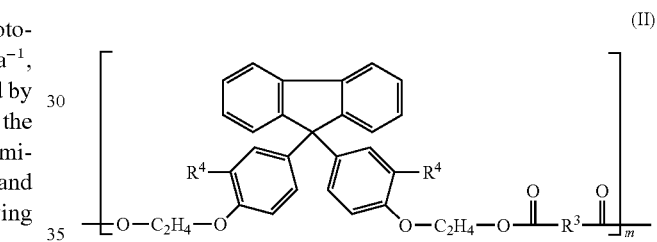

$R^1$: a decalin structure, and $R^2$: hydrogen, halogen or a hydrocarbon group having 1 to 3 carbon atoms;

(II)

$R^3$: an aromatic group, and $R^4$: hydrogen, halogen or a hydrocarbon group having 1 to 3 carbon atoms;

(III)

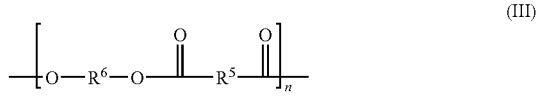

$R^5$: a decalin structure, and $R^6$: spiro glycol residues and optionally also ethylene structures; and (IV)

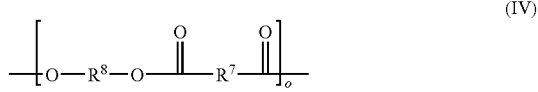

$R^7$: an aromatic group, and $R^8$: spiro glycol residues and optionally also ethylene structures.

2. The retardation film according to claim 1, wherein when a slow axis direction of the retardation film is denoted by x, a direction orthogonal to this x in the film plane is denoted by y, a direction orthogonal to these x and y is denoted by z, and refractive indexes in the directions x, y and z are denoted by nx, ny and nz, respectively, said retardation film satisfies the following equations (1) and (2):

$$nx \geq ny \quad (1),$$

and $$-0.001 < ny - nz < 0.001 \quad (2).$$

3. The retardation film according to claim 1, wherein a glass transition temperature of the polyester is 100° C. or higher.

4. The retardation film according to claim 1, wherein the polyester has an alicyclic structure.

5. The retardation film according to claim 1, wherein the polyester has a cardo structure.

6. The retardation film according to claim 1, wherein the polyester has a cardo structure and when number of aromatic rings in a main chain portion is denoted by Ar(x) and number of aromatic rings in an intersection of the main chain and the cardo structure is denoted by Ar(y), Ar(x) and Ar(y) satisfy the following equation (3):

$$0.9 < Ar(y)/Ar(x) < 1.1 \quad (3).$$

7. The retardation film according to claim 1, wherein $R^3$ and $R^7$ are any of structures shown in the chemical formulas (VI):

(VI)

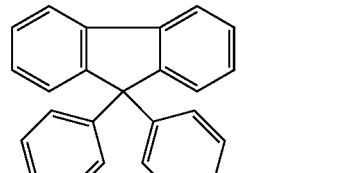

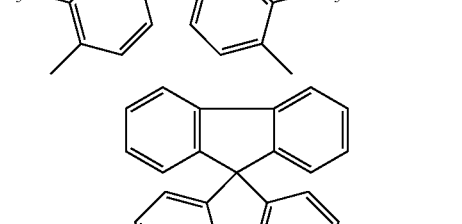

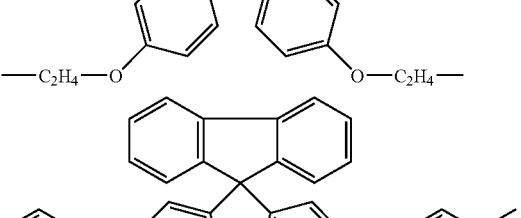

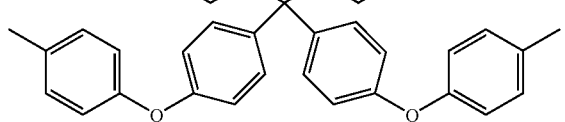

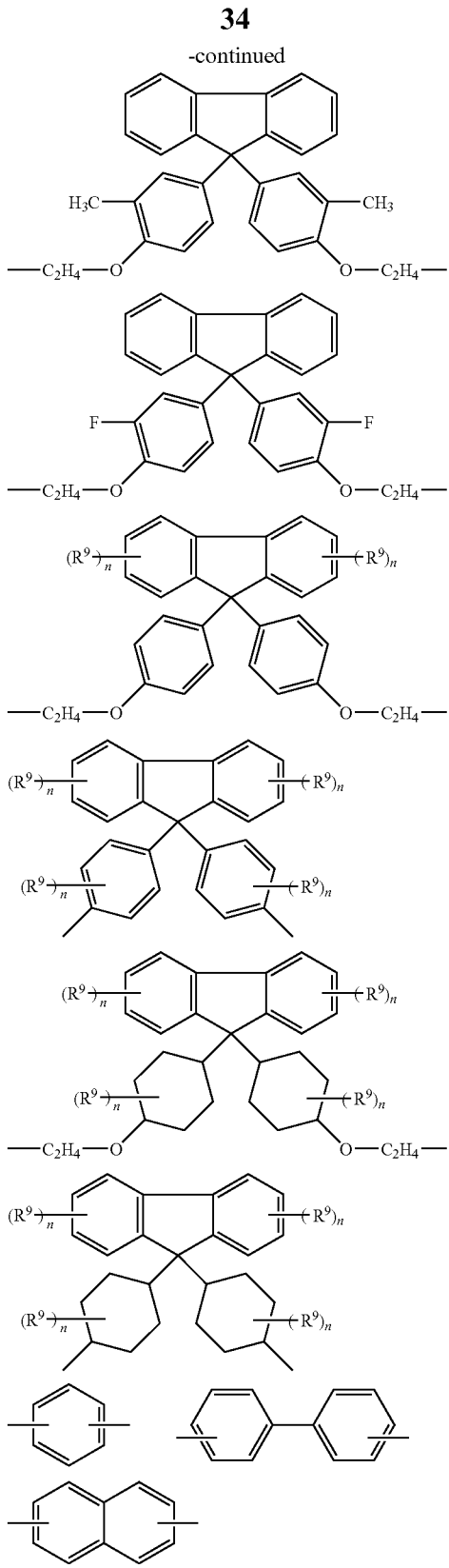

wherein $R^9$: independently represents an arbitrary substituent, and n: independently represents an integer of 0 to 4.

8. The retardation film according to claim 1, wherein the polyester resin contains a phosphorus compound, an alicyclic component and a fluorene derivative component as constituents, and satisfies the following equations (6) and (7):

$$100°\,C. \leq \text{glass transition temperature} \leq 150°\,C. \tag{6}$$

and $$1.0 \leq (Ma/2 + Mb + Mc)/P \leq 5.0 \tag{7}$$

wherein Ma is the number of moles of an alkali metal element contained in one ton of the polyester resin, Mb is the number of moles of an alkaline earth metal element contained in one ton of the polyester resin, Mc is the sum of the number of moles of a zinc element (Zn), a cobalt element (Co) and a manganese element (Mn) contained in one ton of the polyester resin, and P is the number of moles of a phosphorus element contained in one ton of the polyester resin, and wherein a solution haze, which is obtained by measuring a solution formed by dissolving 2 g of a polyester resin in 20 ml of a mixed solvent composed of phenol and 1,1,2,2-tetrachloroethane in proportions of 3:2 (by volume), and using a cell with an optical path length of 20 mm, is 4% or less.

9. A polyester resin composition for optical devices containing a phosphorus compound, an alicyclic component and a fluorene derivative component as constituents, and satisfying the following equations (6) and (7):

$$100°\,C. \leq \text{glass transition temperature} \leq 150°\,C. \tag{6}$$

and $$1.0 \leq (Ma/2 + Mb + Mc)/P \leq 5.0 \tag{7}$$

wherein Ma is the number of moles of an alkali metal element contained in one ton of the polyester resin, Mb is the number of moles of an alkaline earth metal element contained in one ton of the polyester resin, Mc is the sum of the number of moles of a zinc element (Zn), a cobalt element (Co) and a manganese element (Mn) contained in one ton of the polyester resin, and P is the number of moles of a phosphorus element contained in one ton of the polyester resin, wherein a solution haze, which is obtained by measuring a solution formed by dissolving 2 g of a polyester resin in 20 ml of a mixed solvent composed of phenol and 1,1,2,2-tetrachloroethane in proportions of 3:2 (by volume), and using a cell with an optical path length of 20 mm, is 4% or less, and wherein the polyester resin composition is capable of forming the retardation film of claim 1.

\* \* \* \* \*